US012428587B1

(12) United States Patent
Stagon et al.

(10) Patent No.: US 12,428,587 B1
(45) Date of Patent: *Sep. 30, 2025

(54) LIQUID METAL COMPOSITIONS AND METHODS

(71) Applicant: Boston Materials, Inc., Billerica, MA (US)

(72) Inventors: Stephen Peter Stagon, Jacksonville, FL (US); Robert Mone, Billerica, MA (US)

(73) Assignee: Boston Materials, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/054,632

(22) Filed: Feb. 14, 2025

Related U.S. Application Data

(63) Continuation of application No. 18/822,749, filed on Sep. 3, 2024.

(51) Int. Cl.
   *C09K 5/06* (2006.01)

(52) U.S. Cl.
   CPC ..................................... *C09K 5/06* (2013.01)

(58) Field of Classification Search
   CPC . C09K 5/06; C09K 5/063; C09K 5/02; C09K 5/16
   See application file for complete search history.

(56) References Cited

U.S. PATENT DOCUMENTS

| | | | |
|---|---|---|---|
| 4,025,911 A | 5/1977 | Bobeck et al. | |
| 4,481,249 A | 11/1984 | Ebneth et al. | |
| 4,523,628 A | 6/1985 | Vives | |
| 5,432,000 A | 7/1995 | Young et al. | |
| 5,876,540 A | 3/1999 | Pannell | |
| 5,968,639 A | 10/1999 | Childress | |
| 7,073,538 B2 | 7/2006 | Bhatnagar et al. | |
| 7,409,757 B2 | 8/2008 | Hall et al. | |
| 7,439,475 B2 | 10/2008 | Ohta | |
| 7,537,825 B1 | 5/2009 | Wardle et al. | |
| 7,655,581 B2 | 2/2010 | Goering | |
| 7,803,262 B2 | 9/2010 | Haik et al. | |
| 7,832,983 B2 | 11/2010 | Kruckenberg et al. | |
| 7,951,464 B2 | 5/2011 | Roberts | |
| 8,173,857 B1 | 5/2012 | Yananton | |
| 8,197,888 B2 | 6/2012 | Sue et al. | |
| 8,575,045 B1 | 11/2013 | McKnight et al. | |
| 8,790,565 B2 | 7/2014 | Miller | |
| 8,889,761 B2 | 11/2014 | Studart et al. | |
| 9,312,046 B2 | 4/2016 | Hong et al. | |
| 9,388,577 B2 | 7/2016 | Kromer et al. | |
| 9,394,196 B2 | 7/2016 | Peters et al. | |
| 9,732,463 B2 | 8/2017 | Carter et al. | |
| 9,892,835 B2 | 2/2018 | Hong et al. | |
| 9,896,783 B2 | 2/2018 | Kia | |
| 11,479,656 B2 | 10/2022 | Soheilian et al. | |
| 11,767,415 B2 | 9/2023 | Soheilian et al. | |
| 11,820,880 B2 | 11/2023 | Gurijala et al. | |
| 11,840,028 B2 | 12/2023 | Mone et al. | |
| 2005/0058805 A1 | 3/2005 | Kimura et al. | |
| 2005/0061496 A1 | 3/2005 | Matabayas | |
| 2005/0175813 A1 | 8/2005 | Wingert et al. | |
| 2005/0228097 A1* | 10/2005 | Zhong | B82Y 30/00 524/439 |
| 2005/0239948 A1 | 10/2005 | Haik et al. | |
| 2006/0157223 A1* | 7/2006 | Gelorme | H01L 23/42 165/185 |
| 2006/0286361 A1 | 12/2006 | Yonetake et al. | |
| 2008/0145647 A1 | 6/2008 | Ganguli et al. | |

(Continued)

FOREIGN PATENT DOCUMENTS

| | | |
|---|---|---|
| CN | 1784516 A | 6/2006 |
| CN | 1894435 A | 1/2007 |

(Continued)

OTHER PUBLICATIONS

Clarivate Analytics machine translation of CN 108251063 B to Xia et al. published May 11, 2021 (Year: 2021).*
Clarivate Analytics machine translation of CN 110828828 A to Hong et al., published Feb. 21, 2020 (Year: 2020).*
Clarivate Analytics machine translation of JP 2021008369 A to Kaneda et al., published Jan. 28, 2021 (Year: 2021).*
Chinese Office Action for Application No. 20188003308.2 mailed Jun. 29, 2021.
Chinese Office Action for Application No. 20188003308.2 mailed Jan. 24, 2022.
Chinese Office Action for Application No. 201880033308.2 mailed Jul. 29, 2022.
Extended European Search Report for Application No. 18770244.4 mailed Dec. 3, 2020.
European Office Action mailed Nov. 21, 2022 for Application No. 18770244.4.

(Continued)

*Primary Examiner* — Jane L Stanley
(74) *Attorney, Agent, or Firm* — Wolf, Greenfield & Sacks, P.C.

(57) ABSTRACT

The present disclosure generally relates to certain compositions having components that can become liquid or exhibit a phase change during use, and methods related to the same. These can be used, for example, as thermal interface materials for various applications. Certain thermal interface materials such as those discussed herein may represent a new structure in which the material is solid, but becomes liquid during use, which may improve heat transport, for example, because the liquid improves contact or binding of surfaces, thereby allowing improved heat transport across interfaces between surfaces. For example, in some cases, the composition may be a composite of a solid phase material and a phase change material. In certain aspects, the phase change material exhibits a melt temperature, e.g., where the phase change material can transition from a liquid to a solid. The phase change material may include, for example, a metal, a metal oxide, a metal alloy, or the like. Other aspects generally relate to methods of making or using such compositions, kits including such compositions, or the like.

20 Claims, 6 Drawing Sheets

(56) References Cited

U.S. PATENT DOCUMENTS

| | | | |
|---|---|---|---|
| 2008/0274326 A1 | 11/2008 | Kim et al. | |
| 2009/0117269 A1 | 5/2009 | Hansen et al. | |
| 2009/0227162 A1 | 9/2009 | Kruckenberg et al. | |
| 2010/0040902 A1 | 2/2010 | Mizrahi | |
| 2010/0128439 A1* | 5/2010 | Tilak | C09K 5/14 |
| | | | 361/709 |
| 2010/0196688 A1 | 8/2010 | Kritzer et al. | |
| 2010/0320320 A1 | 12/2010 | Kismar et al. | |
| 2011/0186775 A1 | 8/2011 | Shah et al. | |
| 2012/0107599 A1 | 5/2012 | Yonetake et al. | |
| 2012/0289107 A1 | 11/2012 | Beissinger et al. | |
| 2013/0053471 A1 | 2/2013 | Studart et al. | |
| 2013/0252497 A1 | 9/2013 | Schiebel et al. | |
| 2013/0316148 A1 | 11/2013 | Gunnink | |
| 2014/0110049 A1* | 4/2014 | Yuen | H01L 23/373 |
| | | | 156/60 |
| 2014/0250665 A1 | 9/2014 | Choi et al. | |
| 2014/0342630 A1 | 11/2014 | Amtmann et al. | |
| 2015/0168087 A1* | 6/2015 | Kim | H05K 7/20454 |
| | | | 361/720 |
| 2015/0228388 A1 | 8/2015 | Hong et al. | |
| 2016/0055930 A1 | 2/2016 | Humfeld | |
| 2016/0083535 A1 | 3/2016 | Wilenski et al. | |
| 2016/0169009 A1 | 6/2016 | Okamoto et al. | |
| 2016/0340482 A1 | 11/2016 | Williams et al. | |
| 2017/0067186 A1 | 3/2017 | Kia | |
| 2017/0101730 A1 | 4/2017 | Gilbertson | |
| 2017/0173895 A1 | 6/2017 | Williams | |
| 2017/0182700 A1 | 6/2017 | Brady | |
| 2017/0240715 A1 | 8/2017 | Hsiao et al. | |
| 2017/0338497 A1 | 11/2017 | Tatsuno et al. | |
| 2018/0016420 A1 | 1/2018 | Fujimaki | |
| 2018/0016740 A1 | 1/2018 | Kia et al. | |
| 2019/0048500 A1 | 2/2019 | Tierney et al. | |
| 2020/0024795 A1 | 1/2020 | Gurijala et al. | |
| 2020/0066614 A1 | 2/2020 | Cola et al. | |
| 2021/0008840 A1 | 1/2021 | Gurijala et al. | |
| 2021/0009789 A1 | 1/2021 | Soheilian et al. | |
| 2022/0001631 A1 | 1/2022 | Mone et al. | |
| 2023/0002591 A1 | 1/2023 | Soheilian et al. | |
| 2023/0272256 A1 | 8/2023 | Pan et al. | |
| 2024/0052588 A1 | 2/2024 | Padilla et al. | |

FOREIGN PATENT DOCUMENTS

| | | | | |
|---|---|---|---|---|
| CN | 1906234 A | | 1/2007 | |
| CN | 1950200 A | | 4/2007 | |
| CN | 101224601 A | | 7/2008 | |
| CN | 103109330 A | | 5/2013 | |
| CN | 105073848 A | | 11/2015 | |
| CN | 105390210 A | | 3/2016 | |
| CN | 105690802 A | | 6/2016 | |
| CN | 105734535 A | | 7/2016 | |
| CN | 105980512 A | | 9/2016 | |
| CN | 106460312 A | | 2/2017 | |
| CN | 107107537 A | | 8/2017 | |
| CN | 110828828 A | * | 2/2020 | H01M 4/66 |
| CN | 108251063 B | * | 5/2021 | C09K 5/06 |
| EP | 2085215 A1 | | 8/2009 | |
| EP | 2013408 B1 | | 3/2013 | |
| EP | 2883930 A1 | | 6/2015 | |
| EP | 3184288 A1 | | 6/2017 | |
| GB | 1438509 A | | 6/1976 | |
| JP | S49-26381 A | | 3/1974 | |
| JP | S57-149551 A | | 9/1982 | |
| JP | S60-082332 A | | 5/1985 | |
| JP | S63-295751 A | | 12/1988 | |
| JP | 07-197311 A | | 8/1995 | |
| JP | 07-331358 A | | 12/1995 | |
| JP | 2000-281802 A | | 10/2000 | |
| JP | 2003-301048 A | | 10/2003 | |
| JP | 2004-051853 A | | 2/2004 | |
| JP | 2004-103403 A | | 4/2004 | |
| JP | 2004-276478 A | | 10/2004 | |
| JP | 2004-360160 A | | 12/2004 | |
| JP | 2006-335957 A | | 12/2006 | |
| JP | 2007-009363 A | | 1/2007 | |
| JP | 2008-266586 A | | 11/2008 | |
| JP | 2013-023801 A | | 2/2013 | |
| JP | 2015-063664 A | | 4/2015 | |
| JP | 2016-044302 A | | 4/2016 | |
| JP | 2016-064648 A | | 4/2016 | |
| JP | 2018-523599 A | | 8/2018 | |
| JP | 2021008369 A | * | 1/2021 | C04B 35/83 |
| JP | 2022-512188 A | | 2/2022 | |
| WO | WO 2001/025514 A1 | | 4/2001 | |
| WO | WO 2005/085334 A1 | | 9/2005 | |
| WO | WO 2007/130979 A2 | | 11/2007 | |
| WO | WO 2009/009207 A2 | | 1/2009 | |
| WO | WO 2011/100734 A1 | | 8/2011 | |
| WO | WO 2017/027699 A1 | | 2/2017 | |
| WO | WO 2018/175134 A1 | | 9/2018 | |
| WO | WO 2020/123334 A1 | | 9/2018 | |
| WO | WO 2021/007381 A1 | | 1/2021 | |
| WO | WO 2021/007389 A1 | | 1/2021 | |
| WO | WO 2023/163848 A2 | | 8/2023 | |
| WO | WO 2024/039598 A1 | | 2/2024 | |

OTHER PUBLICATIONS

European Office Action mailed Nov. 6, 2023, for Application No. 18770244.4.
Japanese Office Action for Application No. 2020-500780 mailed Feb. 15, 2022.
Japanese Office Action for Application No. 2020-500780 mailed Jun. 28, 2022.
International Search Report and Written Opinion for Application No. PCT/US2018/021975 mailed May 24, 2018.
International Preliminary Report on Patentability for Application No. PCT/US2018/021975 mailed Oct. 3, 2019.
Chinese Office Action for Application No. 2019800800347 mailed Feb. 16, 2022.
Chinese Office Action for Application No. 2019800800347 mailed Jun. 28, 2022.
Chinese Office Action mailed Jan. 10, 2023, for Application No. CN201980080034.7.
Chinese Office Action mailed Nov. 2, 2023, for Application No. 201980080034.7.
Extended European Search Report for Application No. 19896171.6 mailed Aug. 16, 2022.
European Office Action mailed Jul. 14, 2023, for Application No. 19896171.6.
Japanese Office Action mailed Sep. 5, 2023, for Application No. JP2021-532970.
Japanese Office Action mailed Mar. 12, 2024, for Application No. JP2021-532970.
Japanese Office Action mailed Oct. 8, 2024, for Application No. JP2021-532970.
International Search Report and Written Opinion for Application No. PCT/US2019/065142 mailed Mar. 10, 2020.
International Preliminary Report on Patentability for Application No. PCT/US2019/065142 mailed Jun. 24, 2021.
Invitation to Pay Additional Fees for Application No. PCT/US2020/041306 mailed Oct. 29, 2020.
International Search Report and Written Opinion for Application No. PCT/US2020/041306 mailed Dec. 21, 2020.
International Preliminary Report on Patentability for Application No. PCT/US2020/041306 mailed Jan. 20, 2022.
Chinese Office Action mailed Mar. 27, 2024, for Application No. 202080065034.2.
European Office Action mailed Jan. 27, 2023, for Application No. 20751409.2.
International Search Report and Written Opinion for Application No. PCT/US2020/041322 mailed Oct. 9, 2020.
International Preliminary Report on Patentability for Application No. PCT/US2020/041322 mailed Jan. 20, 2022.
Invitation to Pay Additional Fees for Application No. PCT/US2023/012171 mailed Jun. 23, 2023.

(56) References Cited

OTHER PUBLICATIONS

International Search Report and Written Opinion for Application No. PCT/US2023/012171 mailed Aug. 16, 2023.
International Preliminary Report on Patentability for Application No. PCT/US2023/012171 mailed Sep. 12, 2024.
Invitation to Pay Additional Fees for Application No. PCT/US2023/030139 mailed Nov. 16, 2023.
International Search Report and Written Opinion No. PCT/US2023/030139 mailed Jan. 8, 2024.
International Preliminary Report on Patentability No. PCT/US2023/030139 mailed Feb. 27, 2025.
[No Author Listed], Permanent Magnets vs Electromagnets. Adams Magnetic Products. Accessed Sep. 20, 2017. 5 pages.
[No Author Listed], HexTow® IM7 Carbon Fiber. HEXCEL® Product Data Sheet. Jan. 1, 2020. Retrieved from the Internet. 2 pages.
[No Author Listed], Standard Test Method for Thermal Transmission Properties of Thermally Conductive Electrical Insulation Materials. Designation D5470-12. ASTM International. Feb. 2012. 4 pages.
[No Author Listed], Standard Test Method for Thermal Transmission Properties of Thermally Conductive Electrical Insulation Materials. Designation D5470-17. ASTM International. Nov. 2017. 6 pages.
[No Author Listed], New Practical Handbook of Hardware. Ed. Zhenwu, Z. Liaoning Science and Tech Publishing House, Jan. 2015: 1486-7.
Barrett et al., The mechanics of z-fiber reinforcement. Composite Structures. Sep. 1996; 36(1-2): 23-32.
Boden et al., Nanoplatelet size to control the alignment and thermal conductivity in copper-graphite composites. Nano Lett. Jun. 11, 2014;14(6):3640-4. doi: 10.1021/nl501411g. Epub May 22, 2014.
Erb et al., Composites reinforced in three dimensions by using low magnetic fields. Science. Jan. 13, 2012;335(6065):199-204. doi: 10.1126/science.1210822.
Erb et al., Concentration gradients in mixed magnetic and nonmagnetic colloidal suspensions. J Appl Phys. Mar. 7, 2008;103(07A312):1-3.
Erb et al., Magnetic assembly of colloidal superstructures with multipole symmetry. Nature. Feb. 19, 2009;457(7232):999-1002. doi: 10.1038/nature07766.
Erb et al., Non-linear alignment dynamics in suspensions of platelets under rotating magnetic fields. Soft Matter. 2012;8:7604-9.
Gardiner, Z-direction composite properties on an affordable, industrial scale. Composite World. Apr. 20, 2021. <https://www.compositesworld.com/articles/z-direction-composite-properties-on-an-affordable-industrial-scale>. 9 pages.
Hashin, Analysis of the effects of fiber anisotropy on the properties of carbon and graphite fiber composites. J Appl Mech. 1979; 46: 543-50.
Huang, Fabrication and properties of carbon fibers. Materials. Dec. 16, 2009; 2: 2369-403. doi:10.3390/ma2042369.
Jackson et al., Out-of-plane properties. NASA, Langley Research Center Mechanics of Textile Composites Conference. Oct. 1, 1995:315-348.
Kimura et al., Uniaxial alignment of the smallest diamagnetic susceptibility axis using time-dependent magnetic fields. Langmuir. Jul. 6, 2004;20(14):5669-72. doi: 10.1021/la049347w.
Le Ferrand et al., Magnetically assisted slip casting of bioinspired heterogeneous composites. Nat Mater. Nov. 2015; 14(11):1172-9. doi: 10.1038/nmat4419. Epub Sep. 21, 2015.
Li et al., Carbon nanotube/paraffin/montmorillonite composite phase change material for thermal energy storage. Sol Energy. Apr. 2017; 146:1-7. doi: 10.1016/j.solener.2017.02.003.
Libanori et al., Mechanics of platelet-reinforced composites assembled using mechanical and magnetic stimuli. ACS Appl Mater Interfaces. Nov. 13, 2013;5(21):10794-805. doi: 10.1021/am402975a. Epub Oct. 25, 2013.
Libanori et al., Ultrahigh magnetically responsive microplatelets with tunable fluorescence emission. Langmuir. Nov. 26, 2013;29(47):14674-80. doi: 10.1021/la4027305. Epub Nov. 15, 2013.
Martin et al., Designing bioinspired composite reinforcement architectures via 3D magnetic printing. Nat Commun. Oct. 23, 2015;6:8641. doi: 10.1038/ncomms9641.
Martin et al., Understanding and overcoming shear alignment of fibers during extrusion. Soft Matter. Jan. 14, 2015;11(2):400-5. doi: 10.1039/c4sm02108h.
Matsuo, Electric, Dielectric and Magnetic Properties of Polymer and Carbon Fillers. International Workshop on Advanced Polymer Science and Turbulent Drag Reduction. Mar. 10-20, 2008. 57 pages.
Matthews et al., Magnetic alignment of mesophase pitch-based carbon fibers. Appl Phys Lett. Jul. 15, 1996;69(3):430-2.
Ooi et al., On the controllability of nanorod alignment in magnetic fluids. Journal of Applied Physics. Feb. 7, 2008;103(07E910):1-3.
Sander et al., High-performance battery electrodes via magnetic templating. Nature Energy. Aug. 2016;1:1-7.
Sato et al., Recent trend of carbon fiber technology from mesophase pitch (part 1)—the new method for high performance and improved properties. TANSO. 1993; 157: 107-19. Japanese. Abstract Only.
Sherman et al., Fiber sizings: coupling agent companions. CompositesWorld. Aug. 1, 2013. Retrieved from the Internet at URL:https://www.compositesworld.com/articles/fiber-sizings-coupling-agent-companions. Last Accessed Oct. 2, 2020, 1 page.
Sommer et al., Injectable materials with magnetically controlled anisotropic porosity. ACS Appl Mater Interfaces. Oct. 24, 2012;4(10):5086-91. doi: 10.1021/am301500z. Epub Oct. 9, 2012.
Walsh et al., Carbon fibers. Composites. ASM International. 2001; 35-40.
Xing et al., Ice thermal energy storage enhancement using aligned carbon nanotubes under external magnetic field. J Energy Storage. Dec. 1, 2002;56(Part A):105931. doi: 10.1016/j.est.2022.105931.
International Search Report and Written Opinion No. PCT/US2024/044998 mailed Mar. 10, 2025.
Taiwanese Office Action mailed Jul. 15, 2025, for Application No. 113139491.

* cited by examiner

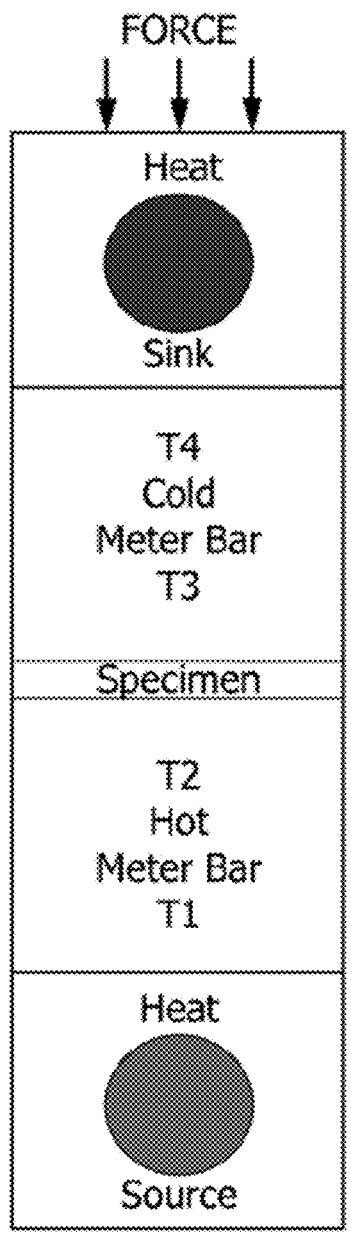 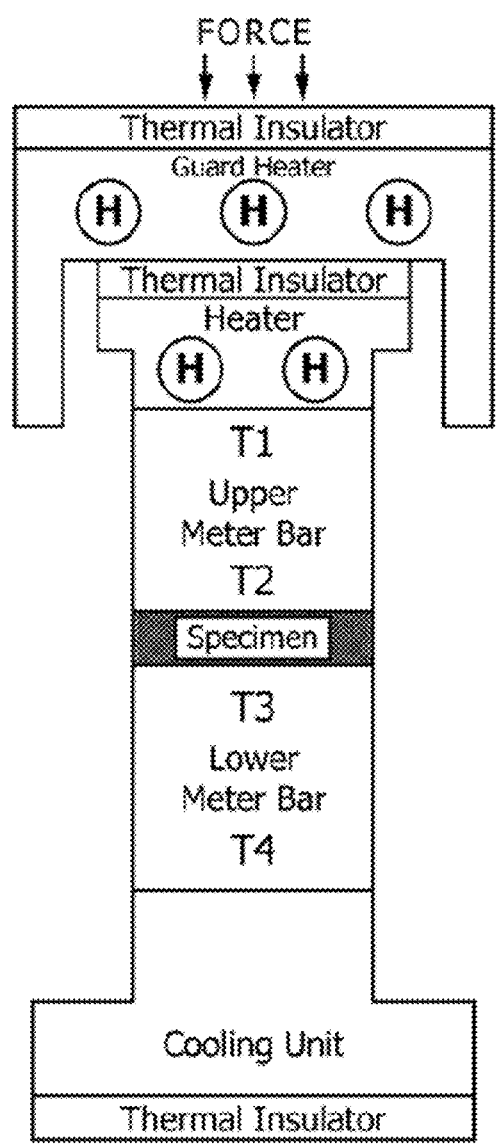
*Fig. 6A*  *Fig. 6B*

LIQUID METAL COMPOSITIONS AND METHODS

RELATED APPLICATIONS

This application claims the benefit of U.S. patent application Ser. No. 18/822,749, filed Sep. 3, 2024, entitled "Liquid Metal Compositions and Methods," incorporated herein by reference in its entirety.

FIELD

The present disclosure generally relates to liquid metal compositions and methods related to the same.

BACKGROUND

Liquid metals are metals or metal alloys that can exist in the liquid state at room temperature. Liquid metals exhibit interesting properties such as high or low viscosity, corrosion resistance, and high or low wettability, depending on various factors, including their atomic composition, purity, and/or processing conditions. Due to their unique properties, liquid metals find use in thermostats, barometers, heat transfer systems, thermal cooling systems, among other applications. It is challenging to incorporate them in composites; thus, improvements are needed.

SUMMARY

The present disclosure generally relates to liquid metal compositions and methods related to the same. The subject matter of the present disclosure involves, in some cases, interrelated products, alternative solutions to a particular problem, and/or a plurality of different uses of one or more systems and/or articles.

In one aspect, the present disclosure is directed to a self-supporting composite. In one set of embodiments, the self-supporting composite is having a thickness of between 10 micrometers and 1 mm. The composite, in another set of embodiments, comprises a solid phase material and a phase change material. In certain embodiments, the solid phase material comprises an open pore volume of less than 90 vol %. In another set of embodiments, the phase change material comprises a metal, a metal oxide, a metal alloy, or combination thereof. In some embodiments, the phase change material exhibits a melt temperature of between 10° C. and 65° C. In certain embodiments, the composite has a thermal impedance of less than 10 $mm^2$ K/W at 10° C. above the melt temperature. In some embodiments, the thermal impedance is determined under 206.8 kPa (30 psi) pressure when tested using an ASTM D5470 Test capable fixture.

In one set of embodiments, a self-supporting composite is having a thickness of between 200 micrometers and 1 mm. In another set of embodiments, the composite comprises a solid phase material and a phase change material. In yet another set of embodiments, the solid phase material comprises an open pore volume of less than 90 vol %. In certain embodiments, the phase change material comprises a metal, a metal oxide, a metal alloy, or combination thereof. In some embodiments, the phase change material exhibits a melt temperature of between 10° C. and 65° C. In some embodiments, the composite has a thermal impedance of less than 10 $mm^2$ K/W at 10° C. above the melt temperature. The thermal impedance, in some embodiments, is determined under 206.8 kPa (30 psi) pressure when tested using an ASTM D5470 Test capable fixture.

In one set of embodiments, a self-supporting composite is having a thickness of between 10 micrometers and 1 mm. In another set of embodiments, the composite comprises a solid phase material and a phase change material that do not chemically react with each other. In yet another set of embodiments, the composite is being free of flux. According to some embodiments, the solid phase material comprises an open pore volume of less than 90 vol %. In certain embodiments, the phase change material comprises a metal, a metal oxide, a metal alloy, or combination thereof. According to certain embodiments, the phase change material exhibits a melt temperature of between 10° C. and 65° C. In some embodiments, the composite has a thermal impedance of less than 10 $mm^2$ K/W at 10° C. above the melt temperature. In some embodiments, the composite comprises a thermal impedance within 2 $mm^2$K/W of the thermal impedance after 1000 hours at a temperature of 5° C. above the melt temperature. The thermal impedance, according to some embodiments, is determined under 206.8 kPa (30 psi) pressure when tested using an ASTM D5470 Test capable fixture.

In one set of embodiments, a self-supporting composite is having a thickness of between 200 micrometers and 1 mm. In some embodiments, the composite comprises a solid phase material and a phase change material that do not chemically react with each other. In certain embodiments, the composite is being free of flux. According to some embodiments, the solid phase material comprises an open pore volume of less than 90 vol %. In some embodiments, the phase change material comprises a metal, a metal oxide, a metal alloy, or combination thereof. According to some embodiments, the phase change material exhibits a melt temperature of between 10° C. and 65° C. In some embodiments, the composite has a pristine thermal impedance of less than 10 $mm^2$ K/W at 10° C. above the melt temperature. In certain embodiments, the composite comprises a thermal impedance within 2 $mm^2$K/W of the thermal impedance after 1000 hours at a temperature of 5° C. above the melt temperature. In certain embodiments, the thermal impedance is determined under 206.8 kPa (30 psi) pressure when tested using an ASTM D5470 Test capable fixture.

In another aspect, the present disclosure is directed to methods of making one or more of the embodiments described herein, for example, self-supporting composites. In still another aspect, the present disclosure is directed to using one or more of the embodiments described herein, for example, composites comprising a phase change material and a solid phase material.

Other advantages and novel features of the present disclosure will become apparent from the following detailed description of various non-limiting embodiments of the disclosure when considered in conjunction with the accompanying figures.

BRIEF DESCRIPTION OF DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures:

FIGS. 6A and 6B illustrate ASTM D5470 Test capable fixtures, in accordance with certain embodiments.

DETAILED DESCRIPTION

Figure 1:
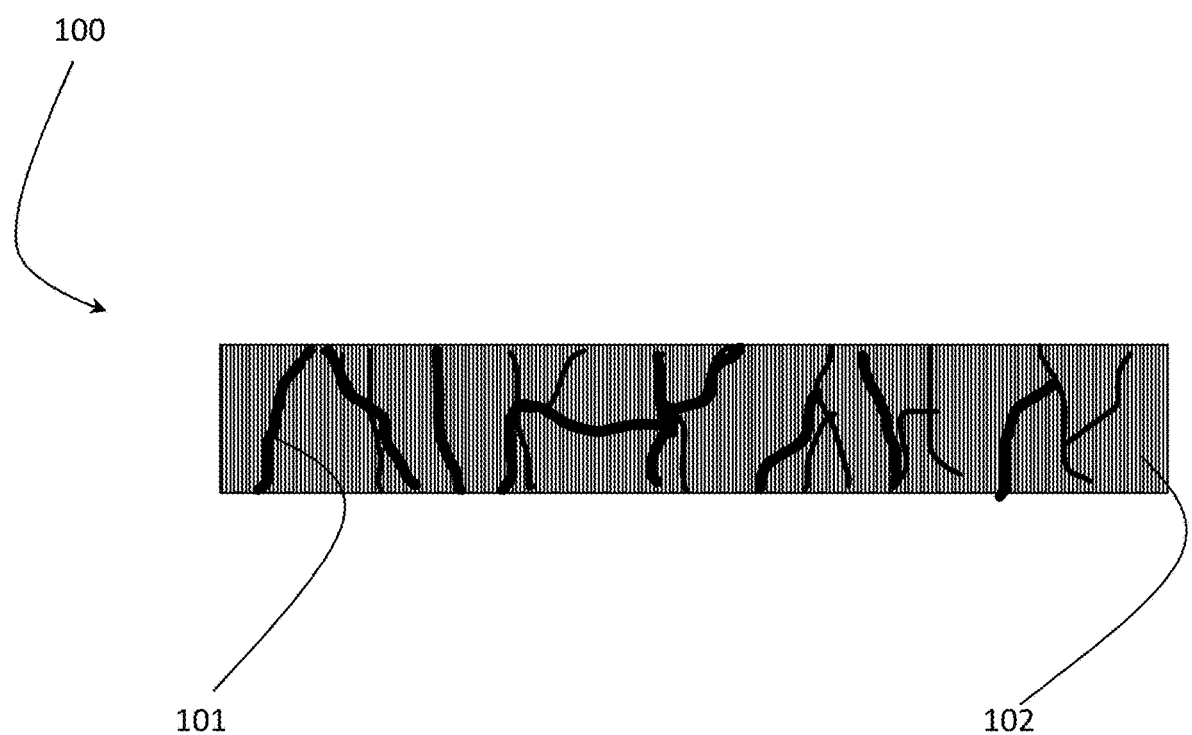
FIG. 1 illustrates a composite formed by solid phase material and phase change material, according to one set of embodiments.

The present disclosure generally relates to certain compositions having components that can become liquid or exhibit a phase change during use, and methods related to the same. These can be used, for example, as thermal interface materials for various applications. Certain thermal interface materials such as those discussed herein may represent a new structure in which the material is solid, but becomes liquid during use, which may improve heat transport, for example, because the liquid improves contact or binding of surfaces, thereby allowing improved heat transport across interfaces between surfaces. For example, in some cases, the composition may be a composite of a solid phase material and a phase change material. In certain aspects, the phase change material exhibits a melt temperature, e.g., where the phase change material can transition from a liquid to a solid. The phase change material may include, for example, a metal, a metal oxide, a metal alloy, or the like. Other aspects generally relate to methods of making or using such compositions, kits including such compositions, or the like.

In some embodiments, the composite is a self-supporting composite. The self-supporting composite may be handled without a support (e.g., without a carrier film, a support material, a base layer, etc.). The self-supporting composite may have any suitable structure and any suitable dimensions. For example, the self-supporting composite may be a film (e.g., micrometer-sized film) that is self-supporting (e.g., free-standing). In some embodiments, the composite can be fabricated on a support material, then the support material removed (e.g., peeled off), leaving the composite, e.g., as a self-supporting structure. The self-supporting composition structure, in other embodiments, may be thicker, or have other dimensions. The self-supporting composite may be fabricated through any one of the methods disclosed herein. In addition, it should be understood that composites such as those described herein need not be self-supporting in all embodiments; for example, in some embodiments, a composite may be present as a film on a support, e.g., where the composite is not able to be self-supporting.

In some embodiments, the determination of a self-supporting composite may be performed at various temperatures; for example, the temperature when the composite exhibits self-supporting behavior may be at least −30° C., at least −20° C., at least −10° C., at least 0° C., at least 5° C., at least 10° C., at least 15° C., or at least 20° C., etc. According to some embodiments, the temperature at which the composite exhibits self-supporting behavior may be no more than 40° C., no more than 30° C., no more than 25° C., no more than 20° C., or no more than 15° C. Any combination of these temperatures are also possible, e.g., at least 10° C. but no more than 25° C.

In addition, in some embodiments, the temperature at which the self-supporting composite is determined may be the melt temperature of a phase change material within the self-supporting composite, and/or a temperature relatively close to the melt temperature. For example, the temperature at which the self-supporting composite is determined may be at least 5° C., at least 10° C., at least 15° C., at least 20° C., or at least 25° C. greater than the melt temperature. In some case, the temperature may be no more than 25° C., no more than 20° C., no more than 15° C., no more than 10° C., or no more than 5° C. above the melt temperature. In some cases, the determination may be made within any combination of these ranges, e.g., the composite may exhibit self-supporting behavior at temperatures of between 5° C. and 25° C., between 10° C. and 15° C., between 5° C. and 10° C., between 20° C. and 30° C., etc. above the melt temperature of the phase change material.

In some embodiments, the self-supporting behavior of the composite can be determined by providing a piece of the composite having a width of at least 6 cm, and a length of at least 6 cm, and supporting it on a support stand such that an unsupported length of the composite extends 3 cm away from the support stand with no support underneath it. A self-supporting material is one that does not exhibit any appreciable permanent changes such as breakage, leakage (e.g., of the phase change material), or permanent deformation (although there may be some sag due to gravity, e.g., at the unsupported end of the composite), for example at the determination temperatures for self-support, such as is described above. According to some embodiments, the self-supporting material can preserve its properties (e.g., mechanical properties) when at least a portion of the material is on a support stand (e.g., a clamp).

In some embodiments, the self-supporting composite may have one or more components that change physical state while maintaining its self-supporting behavior. In some cases, one or more components (e.g., phase change material) within the self-supporting composite may be a liquid, which may be advantageous in some embodiments for improving the thermal conductance at the interfaces of the composite, for example. In some cases, one or more components within the self-supporting components that are liquid may provide enhanced adhesion with other components (e.g., particles) within the composite. The self-supporting composite may be a solid (e.g., solid sheet), in certain cases. The self-supporting comprising a solid sheet may not be deformed, stretched, shattered, etc., during its fabrication. In some cases, the self-supporting composite may exhibit similar or superior mechanical properties to other composites known in the art, such as, for example, composites with a metal matrix.

In some embodiments, for example, the composite may have an average thickness of less than 1 cm, less than 5 mm, less than 3 mm, less than 1 mm, less than 500 micrometers, less than or equal to 250 micrometers, less than or equal to 200 micrometers, less than or equal to 150 micrometers, or less than or equal to 100 micrometers. In some embodiments, the composite has an average thickness of greater than or equal to 50 micrometers, greater than or equal to 100 micrometers, greater than or equal to 150 micrometers, greater than or equal to 200 micrometers, greater than or equal to 500 micrometers, greater than or equal to 1 mm, greater than or equal to 3 mm, greater than or equal to 5 mm, greater than or equal to 1 cm, etc. Combinations of the above recited ranges are possible (e.g., the composite has an average thickness of less than or equal to 250 micrometers and greater than or equal to 50 micrometers, the composite has an average thickness of less than or equal to 150 micrometers and greater than or equal to 100 micrometers). Other ranges are also possible as the present disclosure is not limiting in this regard.

In some embodiments, the composite includes a solid phase material. The solid phase material may be advantageous for the composite in various embodiments (e.g., provide structural support, enhance the properties of the composite, etc.). In certain embodiments, the solid phase material is a solid at room temperature. In some cases, the solid phase material may include metal foam (e.g., reactive or non-reactive metal foam), porous metallic solid, passivated metallic particles, fibers such as carbon fibers, carbon foam, carbon paper, carbon nanoparticles, carbon nanotubes, graphene nanoflakes, polymeric foam, polymeric paper, organic foam, organic paper, ceramic foam, carbon-based particles, ceramic particles, ceramic nanosheets, or the like. These are discussed in more detail below.

The solid material may, in some cases, provide structural integrity to the composite during use, e.g., as the phase change material may be changing phase into a liquid. For example, the solid material may prevent the composite from breaking or permanently deforming during use, e.g., when exposed to temperatures above the melt temperature of the phase change material, such as those temperatures described herein. In some cases, the solid phase material may prevent the composite from leaking the phase change material, e.g., when the composite exposed to temperatures above the melt temperature of the phase change material.

In some embodiments, the solid phase material may form a substantial portion of the composite. According to some embodiments, the solid phase material may be present at a weight percentage of at least 3 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % of the composite. In some cases, the solid phase material may be present at a weight percentage of no more than 95 wt %, no more than 90 wt %, no more than 85 wt %, no more than 80 wt %, no more than 75 wt %, no more than 70 wt %, no more than 65 wt %, no more than 60 wt %, no more than 55 wt %, no more than 50 wt %, no more than 45 wt %, no more than 40 wt %, no more than 35 wt %, no more than 30 wt %, no more than 25 wt %, no more than 20 wt %, no more than 15 wt %, no more than 10 wt %, no more than 5 wt %, or no more than 3 wt % of the composite. Combinations of any of these are also possible in some embodiments. For example, the solid phase material may be present in the composite at between 50 wt % and 60 wt %, between 75 wt % and 80 wt %, between 30 wt % and 50 wt %, between 3 wt % and 50 wt % etc.

The composite may include a phase change material, in addition to a solid phase material. One non-limiting example is schematically illustrated in FIG. 1, where composite 100 includes phase change material 101 and solid phase material 102. The phase change material may include a metal, a metal oxide, a metal alloy, or combination thereof, according to certain embodiments. For example, in some cases, the phase change material may include a metal that is liquid below or near (e.g., within +/−10° C.) room temperature (about 25° C.). In some cases, metal oxides or metal alloys may be advantageous when used as a phase change material. For example, metal oxides/alloys may provide a broad range of properties depending on the chemical composition of the metal oxide/alloy chosen. In some cases, it may be desired to use any combination of a metal, a metal oxide, and a metal alloy. Non-limiting examples of phase change materials include, but are not limited to, gallium, tin, indium, bismuth, cadmium, lead, antimony, aluminum, zinc, tellurium, etc., alloys from combinations thereof, or oxides thereof.

The phase change material may exhibit a melt temperature in some embodiments. The melt temperature of the phase change material is the phase transition (e.g., solid to liquid) temperature of the phase change material. The melt temperature may also correspond to a phase transition (e.g., liquid to solid) temperature when cooling the material. In some cases, the phase change material may exhibit supercooling effects.

In some embodiments, the melt temperature exhibited by the phase change material may be a certain temperature or temperature range. The melt temperature may be at least −30° C., at least −20° C., at least −10° C., at least 0° C., at least 10° C., at least 20° C., at least 30° C., at least 40° C., at least 50° C., or at least 60° C. The melt temperature may be no more than 100° C., no more than 90° C., no more than 80° C., no more than 70° C., no more than 60° C., no more than 50° C. In some embodiments, the melt temperature of the phase change material may be between these values, for example, between 10° C. and 70° C., between 20° C. and 60° C., between 30° C. and 40° C., between 20° C. and 70° C., between 20° C. and 60° C., between 20° C. and 50° C., between 20° C. and 40° C., etc. In some embodiments, for example, the phase change material exhibits a melt temperature between 10° C. and 65° C. In another example, the phase change material exhibits a melt temperature between 0° C. and 80° C. In some cases, the phase change material may be selected to have a melt temperature that is above room temperature (25° C.). For example, the phase change material may exhibit a melt temperature of at least about 30° C., at least about 35° C., at least about 40° C., at least about 45° C., at least about 50° C. In some cases, the melt temperature may be less than 50° C., less than 45° C., less than 40° C., less than 35° C., less than 30° C., etc. Combinations of these are also possible, e.g., the melt temperature may be chosen to be between 25° C. and 30° C., between 25° C. and 35° C., between 30° C. and 40° C., etc. For instance, the phase change material may be an alloy or a eutectic mixture of gallium, tin, indium, bismuth, or other materials such as any of those described herein.

In some embodiments, the phase change material may form a substantial portion of the composite. According to some embodiments, the phase change material may be present at a weight percentage of at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % of the composite. In some cases, the phase change material may be present at a weight percentage of no more than 95 wt %, no more than 90 wt %, no more than 85 wt %, no more than 80 wt %, no more than 75 wt %, no more than 70 wt %, no more than 65 wt %, no more than 60 wt %, no more than 55 wt %, no more than 50 wt %, no more than 45 wt %, no more than 40 wt %, no more than 35 wt %, or no more than 30 wt % of the composite. Combinations of any of these are also possible in some embodiments. For example, the phase change material may be present in the composite at between 50 wt % and 60 wt %, between 75 wt % and 80 wt %, between 30 wt % and 50 wt %, etc.

In some aspects, the phase change material may be present in an open pore volume defined by the solid phase material within the composite. The open pore volume may be defined by the solid phase material, for example, in the form of voids, pores, holes, channels, surface texture, surface roughness, or the like. The open pore volume of the solid phase material may be the volume of the composite that is not occupied by the solid phase material, according to some embodiments. Some or all of the open pore volume may be filled by the phase change material, although in some case, other materials (or air) may also be present in at least some of the open pore volume defined by the solid phase material. According to some embodiments, for example, the composite has an open pore volume defined by the solid phase material of at least 1 vol %, at least 5 vol %, at least 10 vol %, at least 15 vol %, at least 20 vol %, at least 25 vol %, at least 30 vol %, at least 35 vol %, at least vol %, at least 45 vol %, at least 50 vol %, at least 55 vol %, at least 60 vol %, at least 65 vol %, at least 70 vol %, at least 75 vol %, at least 80 vol %, etc. In some cases, the composite has an open pore volume of less than 80 vol %, less than 75 vol %, less than 70 vol %, less than 65 vol %, less than 60 vol %, less than 55 vol %, less than 50 vol %, less than 45 vol %, less than 40 vol %, less than 35 vol % less than 30 vol %, less than 25 vol %, less than 20 vol %, less than 15 vol %, less than 10 vol %, less than 5 vol %, or less than 1 vol %. Combinations of any of these are also possible, e.g., a composite may have an open pore volume of between 30 vol % and 40 vol %, between 65 vol % and 90 vol %, between 20 vol % and 25 vol %, etc.

In some cases, at least 1 vol %, at least 5 vol %, at least 10 vol %, at least 15 vol %, at least 20 vol %, at least 25 vol %, at least 30 vol %, at least 35 vol %, at least 40 vol %, at least 45 vol %, at least 50 vol %, at least 55 vol %, at least 60 vol %, at least 65 vol %, at least 70 vol %, at least 75 vol %, at least 80 vol %, at least 85 vol %, at least 90 vol %, at least 95 vol %, at least 99 vol %, etc. of the open pore volume of the solid phase material may be filled with a phase change material, e.g., as described herein. In some cases, less than 99 vol %, less than 95 vol %, less than 90 vol %, less than 85 vol %, less than 80 vol %, less than 75 vol %, less than 70 vol %, less than 65 vol %, less than 60 vol %, less than 55 vol %, less than 50 vol %, less than 45 vol %, less than 40 vol %, less than 35 vol % less than 30 vol %, less than 25 vol %, less than 20 vol %, less than 15 vol %, less than 10 vol %, less than 5 vol %, or less than 1 vol % of the open pore volume of the solid phase material may be filled with a phase change material. Combinations of any of these are also possible, in certain cases.

According to some embodiments, the open pore volume of the solid phase material can be continuous and/or discontinuous. A continuous open pore volume may have sections of the open pore volume (e.g., pores) that are interconnected together. A discontinuous open pore volume may have sections of the open pore volume that are not connected together. It is also possible that the composite/solid phase material has a combination of continuous open pore volume sections and discontinuous open pore volume sections in certain embodiments.

Figure 2:
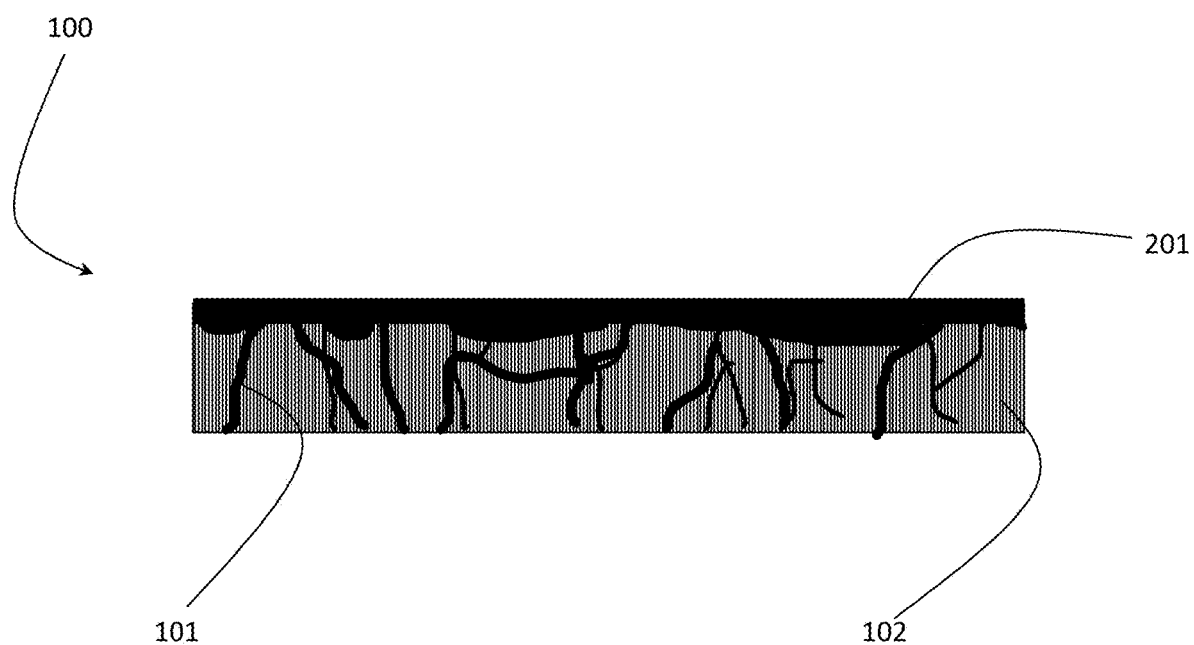
FIG. 2 illustrates a composite with a first continuous outer surface formed by phase change material, according to another set of embodiments.

The phase change material may be distributed in any suitable arrangement within the composite. For example, the phase change material may be present in one or more layers within the composite, or intermixed homogenously within the composite. In some cases, the phase change material may be present in one or more isolated sections or locations within the composite. As a non-limiting example, according to some embodiments, the solid phase material may form a continuous outer surface of the composite, which may, for example, prevent or inhibit the phase change material from leaking out of the composite during use of the composite, e.g., if the composite is heated to temperatures above the melt temperature of the phase change material. The continuous outer surface may be a surface exposed (e.g., exposed to the environment) of the composite. The continuous outer surface may have other structural features (e.g., gaps, pores, or the like) but may still be considered a continuous outer surface. For example, as schematically illustrated in FIG. 2, composite 100 may have an outer surface 101 based on a phase change material.

Figure 3:
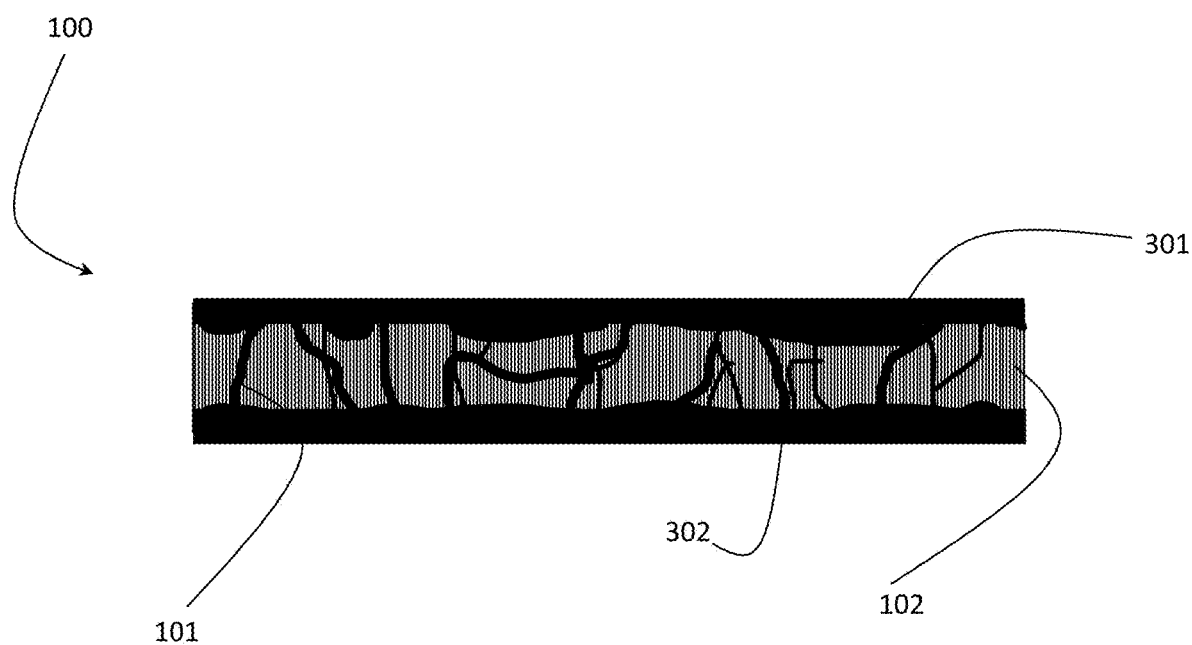
FIG. 3 illustrates a composite with a first continuous outer surface and second continuous outer surface formed by phase change material, according to certain embodiments.
Figure 4:
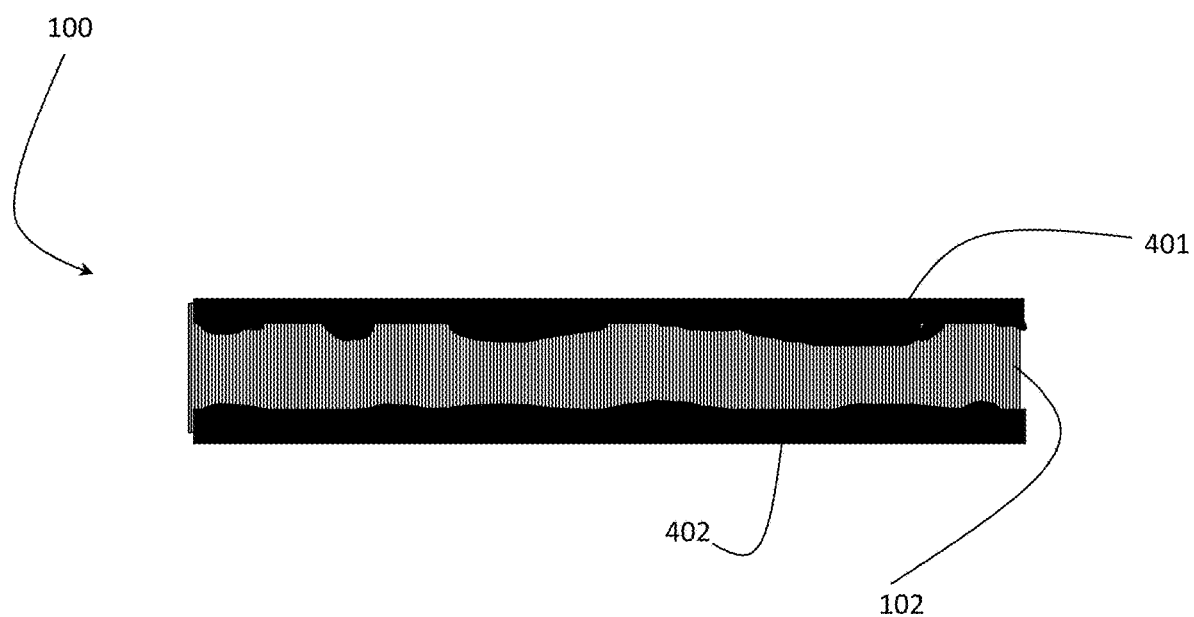
FIG. 4 illustrates a composite with a first continuous outer surface and second continuous outer surface connected through solid phase material, according to certain embodiments.

In some embodiments, one or more continuous outer surfaces (e.g., a first outer surface, a second outer surface, etc.) are possible. According to some embodiments, the first outer surface and second outer surface may be connected to each other, e.g., such that both outer surfaces form a continuous material through the composite. In some embodiments, for example, the first outer surface and the second outer surface are connected to each other through the solid phase material. As a non-limiting example, as schematically illustrated in FIG. 3, in composite 100, first outer surface 301 and second outer surface 302 may form a continues material through the compartment. As another non-limiting example, as schematically illustrated in FIG. 4, in composite 100, first outer surface 401 and second outer surface 402 are connected to each other through solid phase material 102.

In certain embodiments, the solid phase material and phase change material do not chemically react with each other. The absence of a chemical bond, such as, for example, metallic bond or covalent bond, between the solid phase material and phase change material may be indicative of chemical inertness between each other, according to certain embodiments. The solid phase material may be chemically inert in the presence of a phase change material. In some embodiments, the chemical inertness of the solid phase material and phase change material depends on the temperature and/or the properties of both materials. Chemical inertness between the solid phase material and phase change material may be tested through differential scanning calorimetry, for example, or other techniques. In some embodiments, the solid phase material and phase change material do not show phase transitions through differential scanning calorimetry at above or near (e.g., within +/−10° C.) the melt temperature of the phase change material. In some cases, the phase change material and solid phase material show no more than two phase transitions through differential scanning calorimetry. In some other cases, the phase change material and solid phase material show three phase transitions through differential scanning calorimetry, where at least one phase transition is substantially less abundant (e.g., less than 1 wt %) than the other phases transitions.

The composite may exhibit a thermal impedance. According to some embodiments, the thermal impedance of the composite may be important for various reasons (e.g., heat dissipation, heat retention, heat gradients, etc.). The thermal impedance may depend on the resulting structure and/or composition of the formed composite. Techniques for determining thermal impedance include, for example, protocols such as those discussed in standard test method ASTM D5470. In some cases, the thermal impedance may be determined using an ASTM D5470 Test capable fixture at a pressure of 206.8 kPa (30 psi). According to some embodiments, ASTM D5470 Test comprises a technique for measuring and calculating thermal impedance. The ASTM D5470 Test may be the ASTM D5470-17 Test.

In some embodiments, the thermal impedance of the composite is less than 1 mm² K/W, less than 3 mm² K/W, less than 5 mm² K/W, less than 7 mm² K/W, less than 10 mm² K/W, less than 15 mm² K/W, less than 20 mm² K/W, less than 30 mm² K/W, less than 40 mm² K/W, or less than 50 mm² K/W. According to some embodiments, the thermal impedance may be of a certain value (e.g., less than 7 mm² K/W or less than 5 mm² K/W, etc.) when the composite is above the melt temperature. In some cases, the thermal impedance comprises a pristine thermal impedance. In some cases, the thermal impedance comprises a thermal resistance.

The composite may also exhibit an effective thermal conductivity, which incorporates the bulk thermal conductivity and surface contact thermal resistance, in some aspects. According to some embodiments, the effective thermal conductivity of the composite may be important for various reasons (e.g., heat dissipation, heat retention, heat gradients, etc.). The effective thermal conductivity may depend on the resulting structure and/or composition of the formed composite. Techniques for determining effective thermal conductivity include, for example, protocols such as those discussed in standard test method ASTM D5470, or that use an ASTM D5470 Test capable fixture at a pressure of 206.8 kPa (30 psi).

In some embodiments, the effective thermal conductivity of the composite is determined above the melt temperature. For example, the temperature at which the effective thermal conductivity is determined may be at least 5° C., at least 10° C., at least 15° C., at least 20° C., or at least 25° C. greater than the melt temperature. In some case, the temperature may be no more than 25° C., no more than 20° C., no more than 15° C., no more than 10° C., or no more than 5° C. above the melt temperature. In some cases, the determination may be made within any combination of these ranges.

The composite may also have any of a variety of suitable effective thermal conductivities in some embodiments. The effective thermal conductivity of the composite may be advantageously high, in some aspects. In certain embodiments, for example, the composite has an average effective thermal conductivity of greater than or equal to 3 W/m-K, greater than or equal to 5 W/m-K, greater than or equal to 10 W/m-K, greater than or equal to 50 W/m-K, greater than or equal to 100 W/m-K, greater than or equal to 300 W/m-K, greater than or equal to 500 W/m-K, greater than or equal to 700 W/m-K, or greater than or equal to 900 W/m-K. In some embodiments, the composite has an average effective thermal conductivity of less than or equal to 1000 W/m-K, less than or equal to 900 W/m-K, less than or equal to 700 W/m-K, less than or equal to 500 W/m-K, less than or equal to 300 W/m-K, less than or equal to 100 W/m-K, less than or equal to 50 W/m-K, less than or equal to 10 W/m-K, or less than or equal to 5 W/m-K. Combinations of the above recited ranges are also possible (e.g., the composite has an average effective thermal conductivity of greater than or equal to 3 W/m-K and less than or equal to 1000 W/m-K, the composite has an average thermal conductivity of greater than or equal to 100 W/m-K and less than or equal to 300 W/m-K). Other ranges are also possible as the present disclosure is not limiting in this regard.

The composite may maintain its structure after heating at a temperature above the melt temperature of the phase change material in certain cases. According to some embodiments, the composite may maintain its structure after heating for at least 1,000 hours, at least 700 hours, at least 500 hours, at least for 250 hours, at least 100 hours, at least 10 hours, at least 1 hour, or less than one hour, e.g., at the temperatures described herein. For example, the temperature may be at least 5° C., at least 10° C., at least 15° C., at least 20° C., at least 25° C. at least 30° C., at least 40° C., at least 50° C., at least 60° C., at least 70° C., at least 80° C., at least 90° C., at least 100° C., or at least 150° C. greater than the melt temperature. In some case, the temperature may be no more than 150° C., no more than 100° C., no more than 90° C., no more than 80° C., no more than 70° C., no more than 60° C., no more than 50° C., no more than 40° C., no more than 30° C., no more than 25° C., no more than 20° C., no more than 15° C., no more than 10° C., or no more than 5° C. above the melt temperature. In some cases, combinations of these ranges are also possible. The composite may not exhibit any appreciable permanent changes such as breakage, leakage (e.g., of the phase change material), permanent deformation, etc. under such temperatures or other conditions and/or for such times.

The solid phase material may include a variety of materials such as metal foam (e.g., reactive or non-reactive metal foam), porous metallic solid, passivated metallic particles, fibers, carbon foam, carbon paper, carbon nanoparticles, carbon nanotubes, graphene nanoflakes, polymeric foam, polymeric paper, organic foam, organic paper, ceramic foam, carbon-based particles, ceramic particles, ceramic nanosheets among others. One or more than one of these materials and/or other materials may be present in a composite, in various embodiments. Non-limiting examples of such solid phase material follow.

For example, the solid phase material may, in certain embodiments, comprise a plurality of fibers (e.g., carbon fibers). In some embodiments, the plurality of fibers are a plurality of discontinuous fibers (e.g., discontinuous carbon fibers). The plurality of fibers may be aligned substantially orthogonal to the substrate, in some aspects. Further details regarding the substrate and the plurality of fibers are explained herein in greater detail, including, for example, various types of suitable fibers, suitable lengths of fibers, suitable diameters of fibers, suitable methods for producing the substrate, etc. In some embodiments, the solid phase material comprises a plurality of fibers, where the fibers define a substrate. The plurality of fibers defining a substrate may be substantially aligned. According to some embodiments, fibers that are substantially aligned are at least 10 vol %, at least 20 vol %, at least 30 vol %, at least 50 vol %, at least 60 vol % or least 70 vol % of the fibers defining the substrate. According to one non-limiting embodiment, at least 30 vol % of the fibers defining the substrate are substantially aligned.

In some embodiments, the solid phase material comprises a metal foam. The metal foam may include a material with porosity. For example, the metal foam may be a porous copper alloy metal foam that may exhibit the properties of a non-foam copper alloy. According to certain embodiments, the metal foam is the solid phase material that can form a composite with a phase change material. For example, the porosity of the metal foam may be at least 50 vol %, at least 60 vol %, at least 70 vol %, at least 80 vol %, or at least 90 vol %.

According to one set of embodiments, the metal foam may include a reactive metal. The reactive metal may include metals such as copper, silver, golf, nickel, zinc, platinum, iron, or the like. In addition, according to some embodiments, the metal foam comprises a non-reactive metal. Non-limiting examples include titanium, tungsten, vanadium, chromium, hafnium, molybdenum, neodymium, zirconium, or the like. The metal foam may also be an alloy of a reactive metal foam component and/or a non-reactive metal foam component.

The metal foam may, in certain embodiments, have a protective layer, for example, to prevent or inhibit a chemical reaction between the metal foam and the phase change material. It may be advantageous in some embodiments to have a protective layer to the metal foam, e.g., to prevent a chemical reaction (e.g., oxidation reaction), and/or to preserve the chemical composition of the surface of the metal foam. For example, according to one set of embodiments, aluminum or another metal foam material may have a portion of its surface covered with an anodized surface. According to another set of embodiments, a metal foam, such as a copper metal foam, may have a protective layer, e.g., that covers and/or protects at least a portion of its surface.

According to certain embodiments, the solid phase material may include a porous metallic solid. The porous metallic solid may be any suitable metallic solid known in the art (e.g., cellular metal). The solid may include different topologies, structures, degree of order, etc. For example, a porous metallic solid may include a sheet of honeycomb structured pores, where a phase change material may be present in such pores. For example, the porous metallic solid may comprise nickel, or other materials such as any of those described herein. In some embodiments, the porous metallic solid is formed through powder metallurgy or particle sintering, or other techniques.

The solid phase material may comprise a passivation layer in some embodiments. For example, the solid phase material can include metallic particles, e.g., that have a passivation layer, which may protect the metal from reacting with other species (e.g., prevent alloying of the metal). The metal in the metallic particles may be any suitable metal known in the art, e.g., copper, silver, nickel, zinc, platinum, iron, etc. The metallic particles may in certain embodiments have a passivation layer (e.g., copper oxide), which may be able to prevent alloying and/or undesired chemical reactions. In some cases, the passivation layer may protect the metal surface against chemical reactions with the phase change material, other solid phase material components, and/or chemical species in the environment, etc. In certain embodiments, the passivation layer can include a reactive passivation layer and/or a non-reactive passivation layer.

In some embodiments, the solid phase material comprises carbon foam. Carbon foam can have a porous, permeable structure that may allow the phase change material to be introduced. Carbon foam may have a certain degree of rigidity, porosity, thermal impedance, etc., which may offer different advantages to the system (e.g., cost-effective fabrication). For example, the porosity of the carbon foam may be at least 50 vol %, at least 60 vol %, at least 70 vol %, at least 80 vol %, or at least 90 vol %.

According to some embodiments, the solid phase material may include carbon paper. In some cases, carbon paper may be porous, such that the solid phase material can be introduced. For example, the porosity of the carbon foam may be at least 50 vol %, at least 60 vol %, at least 70 vol %, at least 80 vol %, or at least 90 vol %.

In some embodiments, the solid phase material comprises a non-metal foam. Non-limiting foams include polyethylene foam (e.g., low-density polyethylene foam), polystyrene foam, rubber-based foams, or the like. As another non-limiting example, a polystyrene foam may be chemically inert to the phase change material.

In some embodiments, the solid phase material comprises a non-metal foam with metallized surface treatment. Some foams may include polyethylene foam (e.g., low-density polyethylene foam), polystyrene foam, rubber-based foams, or the like. As another non-limiting example, a polystyrene foam may be chemically inert to the phase change material. Non-limiting metallized surface treatment may include nickel, silver, gold, and/or their alloys, etc.

In some embodiments, the solid phase material comprises a non-metal paper. The non-metal paper may include, for example, polymeric paper. The paper may include a single sheet or multiple sheets, for example, that have a porous structure. In some cases, the paper (e.g., cellulose filter paper) may have small pores (e.g., less than 30 microns), which may contain a phase change material, e.g., as discussed herein.

In some embodiments, the solid phase material comprises a non-metal paper with a metallized surface. The non-metal paper may include, for example, polymeric paper. The paper may include a single sheet or multiple sheets, for example, that have a porous structure. In some cases, the paper (e.g., cellulose filter paper) may have small pores (e.g., less than 30 microns), which may contain a phase change material. Non-limiting examples of metals/metal alloys present in the metallized surface include nickel, silver, gold, and their alloys, etc.

In some embodiments, the solid phase material comprises a ceramic foam. Ceramic foam is a foam comprising ceramic. Non-limiting examples include silicon carbine, alumina, silica, etc.

The solid phase material may comprise carbon-based particles in some embodiments. Carbon-based particles may include graphite, graphene, carbon fibers, carbon nanotubes, etc. The carbon-based particles may have different structures and/or geometries. For example, the carbon-based particles can be spherical, plate-shaped, cylindrical, or the like.

In some embodiments, particles such as carbon-based particles, ceramic particles, etc. can have an average dimension that is at least 0.1 micrometers, at least 0.5 micrometers, at least 1 micrometer, at least 2 micrometers, at least 5 micrometers, at least 10 micrometers, at least 20 micrometers, at least 30 micrometers, at least 40 micrometers, at least 50 micrometers, at least 75 micrometers, at least 100 micrometers, at least 200 micrometers, at least 300 micrometers, at least 400 micrometers, or at least 500 micrometers. According to some embodiments, the average dimension of the particles may be no more than 500 micrometers, no more than 400 micrometers, no more than 300 micrometers, no more than 200 micrometers, no more than 100 micrometers, no more than 75 micrometers, no more than 50 micrometers, no more than 40 micrometers, no more than 30 micrometers, no more than 20 micrometers, no more than 10 micrometers, no more than 5 micrometers, no more than 2 micrometers no more than 1 micrometer, no more than 0.5 micrometers, or no more than 0.1 micrometers. The particles may have substantially similar dimensions, or the particles may exhibit a range of dimensions or sizes, etc.

In some embodiments, the solid phase material are ceramic particles. Some non-limiting examples of ceramic particles are silicon carbide, silicon nitride, boron nitride, aluminum oxide, zinc oxide, titanium dioxide, silicon dioxide, zirconium dioxide, iron oxide, calcium oxide, magnesium oxide, and barium oxide. The ceramic particles may be shaped into different structures and/or geometries. For example, the ceramic particles can be spherical, plate-shaped, and/or cylindrical.

In some embodiments, the ceramic particles can have an average dimension of a certain range. According to some embodiments, the ceramic particles may have an average dimension of at least 0.1 micrometers, at least 0.5 micrometers, at least 1 micrometer, at least 2 micrometers, at least 5 micrometers, at least 10 micrometers, at least 20 micrometers, at least 30 micrometers, at least 40 micrometers, at least 50 micrometers, at least 75 micrometers, at least 100 micrometers, at least 200 micrometers, at least 300 micrometers, at least 400 micrometers, or at least 500 micrometers. According to some embodiments, the ceramic particles may have an average dimension of no more than 500 micrometers, no more than 400 micrometers, no more than 300 micrometers, no more than 200 micrometers, no more than 100 micrometers, no more than 75 micrometers, no more than 50 micrometers, no more than 40 micrometers, no more than 30 micrometers, no more than 20 micrometers, no more than 10 micrometers, no more than 5 micrometers, no more than 2 micrometers no more than 1 micrometer, no more than 0.5 micrometers, or no more than 0.1 micrometers. The particles may have substantially similar dimensions, or the particles may exhibit a range of dimensions or sizes, etc.

In some embodiments, the composite is free of flux. Flux is generally a material that may have different purposes, including but not limited to, soldering, smelting, and/or brazing. Some benefits of flux are removing chemical species (e.g., oxides) and potential contaminants. Flux may be made of a single component (e.g., zinc chloride) or multiple components (e.g., silica and borax).

In some embodiments, the solid phase material comprises a metal, an alloy, a carbon-based material, a conductive polymer, and/or combinations thereof. The solid phase material may comprise any of a variety of suitable metals and/or alloys. In certain embodiments, for example, the metal and/or alloy comprises aluminum (Al), titanium (Ti), nickel (Ni), zirconium (Zr), niobium (Nb), tantalum (Ta), hafnium (Hf), stainless steel (SS), and/or combinations thereof. In some embodiments, the metal and/or alloy comprises a metal and/or alloy foil. In certain embodiments, the metal and/or alloy comprises metal and/or alloy particles. Other metals and/or alloys are also possible as the present disclosure is not meant to be limiting in this regard.

The solid phase material, in some embodiments, may comprise any of a variety of suitable carbon-based materials. In certain embodiments, for example, the carbon-based material comprises graphite, graphene, a carbon nanostructure (e.g., carbon nanotubes, carbon nanowires, etc.), carbon black, and/or combinations thereof. The carbon-based material may comprise a powder (e.g., carbon and/or graphite powder) or fibers (e.g., carbon and/or graphite fibers), in some aspects. Other carbon-based materials are also possible as the present disclosure is not limiting in this regard.

Certain embodiments as discussed herein are generally directed to fiber volume fractions (e.g., of substantially aligned fibers such as those discussed herein) of at least 40% fiber volume, at least 45% fiber volume, at least 50% fiber volume, at least 55% fiber volume, at least 60% fiber volume, at least 65% fiber volume, at least 70% fiber volume, etc.

A variety of techniques may be used to align the fibers (e.g., discontinuous fibers) in various embodiments, including magnetic fields, shear flow, or the like, as are discussed in more detail below. As a non-limiting example, magnetic particles, including those discussed herein, can be attached to the fibers, and a magnetic field may then be used to manipulate the magnetic particles. For instance, the magnetic field may be used to move the magnetic particles into a composite, and/or to align the fibers within the composite. The magnetic field may be constant or time-varying (e.g., oscillating), for instance, as is discussed herein. For example, an applied magnetic field may have a frequency of 1 Hz to 500 Hz and an amplitude of 0.01 T to 10 T. Other examples of magnetic fields are described in more detail below.

In some cases, the fibers (e.g., discontinuous fibers) may have any of a variety of suitable lengths. In some embodiments, for example, the fibers have an average length, or characteristic dimension, of at least 1 nm, at least 3 nm, at least 5 nm, at least 10 nm, at least 30 nm, at least 50 nm, at least 100 nm, at least 300 nm, at least 500 nm, at least 1 micrometer, at least 3 micrometers, at least 5 micrometers, at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 10 mm, at least 15 mm, etc. In certain embodiments, the fibers may have an average length, or characteristic dimension, of no more than 5 cm, no more than 3 cm, no more than 2 cm, no more than 1.5 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, no more than 5 micrometers, no more than 3 micrometers, no more than 1 micrometers, no more than 500 nm, no more than 300 nm, no more than 100 nm, no more than 50 nm, no more than 30 nm, no more than nm, no more than 5 nm, etc. Combinations of any of these are also possible. For example, the plurality of fibers may have an average length of between 1 mm and 5 mm.

In addition, the fibers (e.g., discontinuous fibers) may also have any suitable average diameter. For instance, the fibers may have an average diameter of at least 5 micrometers, at least micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 2 cm, at least 3 cm, at least 5 cm, at least 10 cm, etc. In certain embodiments, the fibers may have an average diameter of no more than 10 cm, no more than 5 cm, no more than 3 cm, no more than 2 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, no more than 5 micrometers, etc. Combinations of any of these are also possible. For example, the fibers may have an average diameter of between 5 micrometers and 50 micrometers, 10 micrometers and 100 micrometers, between 50 micrometers and 500 micrometers, between 100 micrometers and 5 mm, etc.

In certain embodiments, the fibers (e.g., discontinuous fibers) may have a length that is at least 10 times or at least 50 times its thickness or diameter, on average. In some cases, the fibers may have an average aspect ratio (ratio of fiber length to diameter or thickness) of at least 3, at least 5, at least 10, at least 30, at least 50, at least 100, at least 300, at least 500, at least 1,000, at least 3,000, at least 5,000, at least 10,000, at least 30,000, at least 50,000, or at least 100,000. In some cases, the average aspect ratio of the fibers may be less than 100,000, less than 50,000, less than 30,000, less than 10,000, less than 5,000, less than 3,000, less than 1,000, less than 500, less than 300, less than 100, less than 50, less than 30, less than 10, less than 5, etc. Combinations of any of these are also possible in some cases; for instance, the aspect ratio may be between 5, and 100,000.

In some instances, the fibers (e.g., discontinuous fibers) may comprise a relatively large portion of the composite. For example, in certain embodiments, the fibers may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the mass or volume of the composite. In some cases, the fibers comprise no more than 97%, no more than 95%, no more than 90%, no more than 85%, no more than 80%, no more than 70%, no more than 60%, no more than 50%, no more than 40%, no more than 30%, no more than 20%, or no more than 10% of the mass or volume of the composite. Combinations of any of these are also possible.

At least some of the fibers (e.g., discontinuous fibers) may be uncoated. In some cases, however, some or all of the fibers (e.g., discontinuous fibers) may be coated. The coating may be used, for example, to facilitate the adsorption or binding of particles, such as magnetic particles, onto the fibers, or for other reasons.

As one non-limiting example, at least some of the fibers are coated with sizing. Some examples of coatings or sizings include, but are not limited to, polypropylene, polyurethane, polyamide, phenoxy, polyimide, epoxy, or the like. These can be introduced, for example, as a solution, dispersion, emulsion, etc. As other examples, the fibers may be coated with a surfactant, a silane coupling agent, an epoxy, glycerine, polyurethane, an organometallic coupling agent, or the like. Non-limiting examples of surfactants include oleic acid, sodium dodecyl sulfate, sodium lauryl sulfate, etc. Non-limiting examples of silane coupling agents include amino-, benzylamino-, chloropropyl-, disulfide-, epoxy-, epoxy/melamine-, mercapto-, methacrylate-, tertasulfido-, ureido-, vinyl-, isocynate-, and vinly-benzyl-amino-based silane coupling agents. Non-limiting examples of organometallic coupling agents include aryl- and vinyl-based organometallic coupling agents.

It should be understood that not all of the particles (if present) are necessarily magnetic. In some cases, nonmagnetic particles may be used, e.g., in addition to and/or instead of magnetic particles. Non-limiting examples of nonmagnetic particles include glass, polymer, metal, or the like. In addition, in some embodiments, no particles are present.

The particles (if present) may be spherical or non-spherical, and may be of any suitable shape or size. The particles may be relatively monodisperse or come in a range of sizes. In some cases, the particles may have a characteristic dimension, on average, of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 1.5 cm, at least 2 cm, at least 3 cm, at least 5 cm, at least 10 cm, etc. The particles may also have an average characteristic dimension of no more than 10 cm, no more than 5 cm, no more than 3 cm, no more than 2 cm, no more than 1.5 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the particles may exhibit a characteristic dimension of or between 100 micrometer and 1 mm, between 10 micrometer and 10 micrometer, etc. The characteristic dimension of a nonspherical particle may be taken as the diameter of a perfect sphere having the same volume as the nonspherical particle.

In addition, in some aspects, the composite may further comprise fillers or additional materials, e.g., in addition to fibers (e.g., discontinuous fibers). For instance, in certain embodiments, the composite may further comprise one or more ceramics, such as boron nitride, alumina, titania, or the like. In addition, in some embodiments, the composite may further comprise one or more metals, such as aluminum, copper, silver, tin, gold, etc. In addition, in one embodiment, such materials present within the composite may be formed by fusing particles together, e.g., during formation of the composite. Other materials may also be present in the substrate in some cases as well.

In one set of embodiments, a binder is also present within the composite, e.g., which may be used to bind the fibers (e.g., discontinuous fibers), e.g., within the composite. For example, the binder may facilitate holding the fibers in position within the composite. However, it should be understood that the binder is optional and not required in all cases. In some cases, the binder may comprise a resin. The binder may include, for example, a thermoset, thermoplastic, and/or a vitrimer. In certain embodiments, the binder may comprise a thermoplastic solution, a thermoplastic melt, thermoplastic pellets, a thermoset resin, a volatile compound such as a volatile organic compound, water, or an oil. Additional non-limiting examples of binders include an epoxy, polyester, vinyl ester, polyethylenimine, polyetherketoneketone, polyaryletherketone, polyether ether ketone, polyphenylene sulfide, polyethylene terephthalate, a polycarbonates, poly (methyl methacrylate), acrylonitrile butadiene styrene, polyacrylonitrile, polypropylene, polyethylene, nylon, a silicone rubber, polyvinylidene fluoride, styrene butadiene rubber, or a pre-ceramic monomer, a siloxane, a silazane, or a carbosilane. In some cases, a binder may comprise a covalent network polymer prepared from an imine-linked oligomer and an independent crosslinker comprising a reactive moiety. Non-limiting examples of reactive moieties include epoxy, isocyanate, bismaleimide, sulfide, polyurethane, anhydride, and/or polyester. Examples of vitrimers include, but are not limited to, epoxy resins based on diglycidyl ether of bisphenol A, aromatic polyesters, polylactic acid (polylactide), polyhydroxyurethanes, epoxidized soybean oil with citric acid, polybutadiene, etc. The binder may also include mixtures including any one or more of these materials and/or other materials, in certain embodiments.

In some embodiments, the binder may comprise at least 1%, at least 2%, at least 3%, at least 4%, at least 5%, at least 7%, at least 10%, at least 15%, at least 20%, or at least 25% of the mass of the composite, and/or no more than 25%, no more than 20%, no more than 15%, no more than 10%, no more than 7%, no more than 5%, no more than 4%, no more than 3%, no more than 2%, or no more than 1% of the mass of the composite.

According to certain embodiments, a composite as described herein may comprise one or more additives and/or fillers. In some embodiments, for example, the additive and/or filler may comprise one or more secondary conductive materials dispersed in one or more components of the composite. In certain embodiments, at least a portion of the additive and/or filler is in electrical contact with at least a portion of the composite.

Any of a variety of suitable additives and/or fillers may be employed. In some embodiments, for example, the additive and/or filler comprises a carbon-based material. Suitable carbon-based materials include, but are not limited to, graphite, graphene, a carbon nanostructure (e.g., carbon nanotubes, carbon nanowires, etc.), carbon black, and/or combinations thereof. The carbon-based material may be a powder (e.g., carbon and/or graphite powder) or a fiber (e.g., carbon and/or graphite fibers), in some aspects. Other carbon-based materials are also possible.

In some embodiments, the additive and/or filler comprises a metal and/or alloy. Suitable metals and/or alloys comprise aluminum (Al), titanium (Ti), nickel (Ni), stainless steel (SS), and/or combinations thereof. In certain embodiments, the additive and/or filler comprises a polymer (e.g., a conductive polymer, a non-conductive polymer). In some embodiments, the additive and/or filler comprises a colorant and/or dye. Other additives and/or fillers are also possible.

Certain aspects are generally directed to methods of making any of the composites described herein. Non-limiting examples include, but are not limited to, mechanical mixing; ultrasonic mixing; casting; spraying; cold spraying; liquefication and solidification; pouring and solidification; electrowetting; electromagnetic mixing; pressing/rolling cryomilled particles; submerging; pressing; among others.

For example, in some embodiments, the composite is formed by mixing the phase change material and the solid phase material, e.g., mechanically. Mechanical mixing may be performed, for example, by a mixer or an agitator, which may allow the solid phase material and phase change material to be mixed together.

In some embodiments, the composite is formed by ultrasonic mixing of the solid phase material and the phase material. Ultrasonic mixing may be accomplished, for example, through sonication of the solid phase material and phase change material using ultrasonic frequencies (i.e., more than 20 kHz).

In some embodiments, the composite is formed by casting the phase change material onto the solid phase material. The phase change material may be casted onto the solid phase material to form a composite, where, according to some embodiments, the phase change material may be a liquid that becomes a solid (i.e., solidifies) after casting. In some embodiments, casting the phase change material may occur in a pressure chamber, which is able to apply either a positive pressure (i.e., more than 1 atm) or negative pressure (i.e., less than 1 atm) during casting.

In some embodiments, the phase change material is sprayed onto the solid phase material to form the composite. According to some embodiments, spraying the phase change material may be advantageous for different reasons (e.g., to disperse the phase change material homogenously).

Spraying the phase change material onto the solid phase material may be employed under different circumstances (e.g., roll-to-roll fabrication), etc.

Spraying the phase change material may include cold spraying in certain embodiments. During cold spraying, the phase change material (e.g., metallic particles) are accelerated in a gas medium and then deposited on the solid phase material, thus helping form a composite. Cold spraying may be performed using a variety of techniques, for example, a robotic arm with a cold spray nozzle.

In some embodiments, the composite is formed by melting a phase change material onto the solid phase material. In some cases, the phase change material may be a solid that is deposited on the solid phase material, followed by being heated and liquified, and then cooled and solidified on the solid phase material. In some embodiments, the liquification and solidification of the phase change material occurs under an applied pressure (e.g., inside a pressure chamber with positive pressure or negative pressure being applied).

In some embodiments, the composite is formed by pouring the phase change material (e.g., a liquid phase change material) onto the solid phase material. In some embodiments, pouring a liquid phase material is followed by solidifying (e.g., cooling) the phase change material. According to some embodiments, a composite (e.g., self-supporting composite) is formed after solidifying the phase change material.

In some embodiments, the composite is formed by electrowetting the solid phase material. Electrowetting may occur by applying a voltage (e.g., a direct current voltage) to the solid phase material. It may be advantageous to use electrowetting on the solid phase material for certain reasons (e.g., change the wetting properties of the material). In certain cases, it may be preferred to form a composite by introducing the phase change material while the solid phase material is being electrowetted.

In some embodiments, electromagnetic mixing (i.e., electromagnetic stirring) can form a composite. It should be understood that electromagnetic mixing involves a phase change material capable of interacting with a magnetic field (e.g., magnetic field from a static induction coil). In some cases, such magnetic field can be helpful for mixing the phase change material and solid phase material to form a composite.

In some embodiments, the phase change material is a cryomilled phase change material. It may be desired to use a cryomilled phase change material to form a composite when the phase change material is difficult to process (e.g., forms lumps/clusters) at room temperature. The cryomilled phase change material may be cryomilled particles, which may have been grinded under cryomilling conditions (e.g., less −50° C.). In certain embodiments, the cryomilled particles are mixed with a solid phase material (e.g., polymeric particles). In such embodiments, the cryomilled particles and solid phase material may be pressed and/or rolled together to form a composite.

In some embodiments, the phase change material is a liquid phase change material, where the solid phase material is submerged in the liquid phase change material. In some cases, it may be advantageous to submerge the solid phase material in a liquid phase change material (e.g., if processability is challenging). Submerging the solid phase material in the liquid phase change material may occur at a temperature higher than room temperature (e.g., more than 35° C.) when the phase change material is a liquid, and, according to some embodiments, the phase change material and the solid phase material can be cooled thereafter to form a composite.

In some embodiments in which the phase change material is a solid, the composite is formed by pressing the solid phase change material and the solid phase material together. Pressing the solid phase change material and the solid phase material can be executed through any of various methods known in the art (e.g., rolling mill). In some cases, pressing the solid phase change material and solid phase material may form a composite with components that are substantially adhered to each other.

The following documents are incorporated herein by reference in their entireties: Int. Pat. Apl. Pub. Nos. WO 2018/175134, WO 2020/123334, WO 2021/007381, WO 2021/007389, WO 2023/163848, and WO 2024/039598. In addition, Int. Pat. Apl. Ser. No. PCT/US24/35747 is also incorporated herein by reference in its entirety.

The following examples are intended to illustrate certain embodiments of the present disclosure, but do not exemplify the full scope of the disclosure.

Example 1

This example relates to mechanically agitated carbon fibers and liquid metals. A pitch-derived carbon fibers that are mechanically agitated within gallium and gallium oxide mixture to create a slurry, of which the fiber composition is greater than 10% by volume. Then, the slurry is heated to above 30° C. and casted on to a surface under magnetic field with strength of less than 5 T to orient the fibers in a direction perpendicular to the casting surface. The resulting casted film is cooled to room temperature to create a self-supporting composite film.

Figure 5:
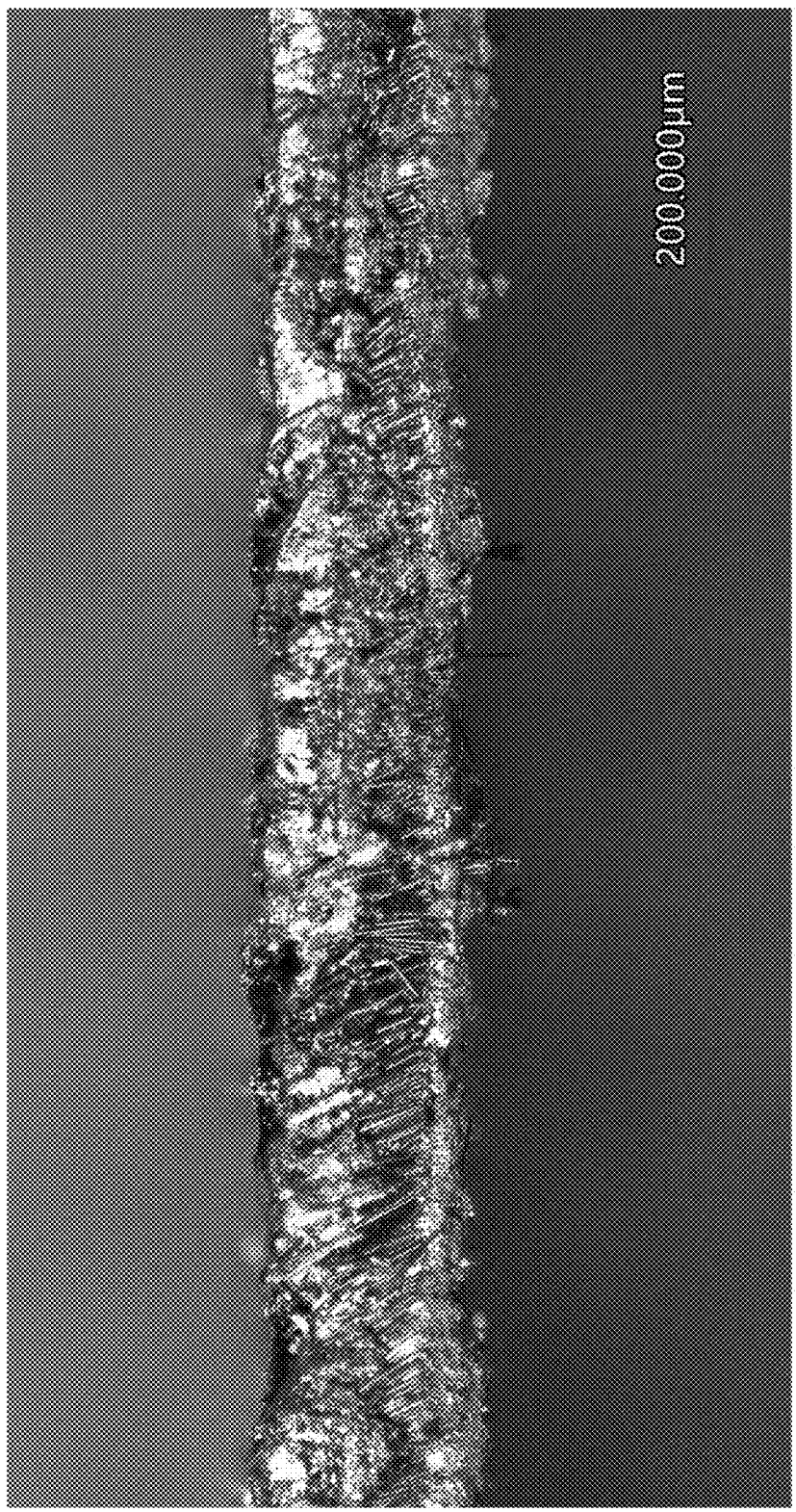
FIG. 5 illustrates optical images of a composite, according to some embodiments.

Cross-sectional optical micrographs of a self-supporting composite film are shown in FIG. 5.

Example 2

This example describes an ASTM D5470 Test capable fixture, and techniques for using it. See also ASTM D5470-17, incorporated herein by reference in its entirety.

The general features of an apparatus that meets the requirements of this method are shown in FIGS. 6A and 6B. This apparatus imposes the required test conditions and accomplishes the required measurements. It is one possible engineering solution, not a uniquely exclusive implementation.

The test surfaces are to be smooth within 0.4 microns and parallel to within 5 microns.

The heat sources are either electrical heaters or temperature controlled fluid circulators. Typical electrical heaters are made by embedding wire wound cartridge heaters in a highly conductive metal block. Circulated fluid heaters consist of a metal block heat exchanger through which a controlled temperature fluid is circulated to provide the required heat flow as well as temperature control.

Heat flow through the specimen is able to be measured with meter bars regardless of the type of heater used.

Electrical heaters offer convenient measurement of the heating power generated but must be combined with a guard heater and high quality insulation to limit heat leakage away from the primary flow through the specimen.

Heat flow meter bars are able to be constructed from high conductivity materials with well documented thermal conductivity within the temperature range of interest. The temperature sensitivity of thermal conductivity must be considered for accurate heat flow measurement. The thermal conductivity of the bar material is recommended to be greater than 50 W/m. K.

Guard heaters are comprised of heated shields around the primary heat source to eliminate heat leakage to the environment. Guard heaters are insulated from the heat source and maintained at a temperature within +/−0.2 K of the heater. This effectively reduces the heat leakage from the primary heater by nullifying the temperature difference across the insulation. Insulation between the guard heater and the heat source will be at least the equivalent of one 5 mm layer of FR-4 epoxy material.

If the heat flow meter bars are used on both the hot and cold surfaces, guard heaters and thermal insulation is not required and the heat flow through the test specimen is computed as the average heat flow through both meter bars.

Meter bars are able to also be used to determine the temperature of the test surfaces by extrapolating the linear array of meter bar temperatures to the test surfaces. This is able to be done for both the hot side and cold side meter bars. Surface temperatures are able to be measured with thermocouples that are located in extreme proximity to the surfaces although this can be mechanically difficult to achieve. Meter bars are able to be used for both heat flow and surface temperature measurement or for exclusively one of these functions.

The cooling unit is commonly implemented with a metal block cooled by temperature controlled circulating fluid with a temperature stability of +/−0.2 K.

The contact pressure on the specimen is able to be controlled and maintained in a variety of ways, including linear actuators, lead screws, pneumatics, and hydraulics. The desired range of forces must be applied to the test fixture in a direction that is perpendicular to the test surfaces and maintains the parallelism and alignment of the surfaces.

The material type will dictate the method for controlling specimen thickness. In all cases, prepare specimens of the same area as the contacting test surfaces. If the test surfaces are not of equal size, prepare the specimen equal to the dimension of the smaller test surface.

Type I—Use shims or mechanical stops to control the thickness of the specimen between the test surfaces. Spacer beads of the desired diameter is able to also be used in approximately 2% volumetric ratio and thoroughly mixed into the sample prior to being applied to the test surfaces.

Type II—Use an adjustable clamping pressure to deflect the test specimen by 5% of its uncompressed thickness. This represents a trade-off between lower surface contact resistance and excessive sample deflection.

Type III—Measure the sample thickness in accordance with Test Method C of Test Methods D374.

Prepare specimens from material that is in original, as-manufactured condition or as noted otherwise. Remove any contamination and dirt particles. Do not use solvent that will react with or contaminate the specimens.

Close the test stack and apply the clamping pressure required for the specimen to be tested.

Turn on the heating and cooling units and let stabilize at the specified set points to give an average sample temperature of 50° C. (average of T2 and T3), unless otherwise specified.

Zero the thickness measuring device (micrometer, LVDT, laser detector, encoder, and so forth).

Machines without an in situ thickness measuring apparatus.

At room temperature, measure the specimen thickness in accordance with Test Method C of Test Methods D374.

Load the specimen on the lower test stack.

Dispense Type I grease and paste materials onto the lower test stack surface. Melt phase change compounds to dispense onto the stack.

Place Type II and III specimens onto the lower test stack.

Close the test stack and apply clamping pressure.

Type I materials being tested with shims to control the test thickness require only enough pressure to squeeze out excess material and contact the shim but not too much pressure that will result in the shim damaging the surfaces of the test stacks.

For machines with screw stops, electromechanical, or hydraulic actuators controlling the position of the upper test stack, the magnitude of the clamping pressure is not critical.

Raise the temperature of the test stack above the specimen melting point to enable phase change materials to flow and permit closing of the test stacks. After the material has flowed, return the heating and cooling units to the required set points to maintain an average specimen temperature of 50° C. before beginning the test, unless otherwise specified.

Type II materials require enough pressure to coalesce stacked specimens together and minimize interfacial thermal resistances. Too much pressure will possibly damage the specimens. This will possibly be as low as 0.069 MPa (10 psi) for softer specimens or as high as 3.4 MPa (500 psi) for harder specimens. Alternatively, screws or linear actuators are able to be used to control the specimen thickness under test for easily deformable Type II materials.

Type III materials require enough pressure to exclude excess thermal grease from the interface and to flatten specimens that are not flat. This will possibly be as low as 0.69 MPa (100 psi) for flat specimens with low viscosity thermal grease or as high as 3.4 MPa (500 psi) for non-flat specimens or when using high viscosity thermal grease.

Record the temperatures of the meter bars and the voltage and current applied to electrical heaters at equilibrium. Equilibrium is attained when, at constant power, 2 sets of temperature readings taken at 5 minute intervals differ by less than +/−0.1° C., or if the thermal impedance has changed by less than 1% of the current thermal impedance over a 5 minute time span.

Calculate the mean specimen temperature and the thermal impedance. Label the calculated thermal impedance for the single-layer specimen as the "thermal impedance" of the sample.

Determine the thermal impedance of at least 3 specimen thicknesses. Maintain the mean temperature of the specimens at 50 +/−2° C. (unless otherwise specified) by reducing the heat flux as the specimen thickness is increased.

For specimens that need to be stacked to get different thicknesses, first measure the thermal impedance of one layer alone, then measure the thermal impedance of 2 layers stacked together, and then measure the thermal impedance of 3 layers stacked together.

For specimens of 3 different thicknesses A, B, and C, first measure the thermal impedance of specimen A alone, then measure the thermal impedance of specimen B alone, then measure the thermal impedance of specimen C alone.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the disclosure includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
a self-supporting composite having a thickness of between 10 micrometers and 1 mm, the composite comprising a solid phase material comprising fibers and a phase change material, the phase change material comprising a metal, a metal oxide, a metal alloy, or a combination thereof, wherein the metal of the metal, metal oxide, metal alloy, or combination thereof comprises gallium, bismuth, indium, and/or tin, and wherein the solid phase material comprises an open pore volume of less than 80 vol %,
wherein the phase change material exhibits a melt temperature of between 10° C. and 65° C., wherein the composite has a thermal impedance of less than 10 mm$^2$ K/W at 10° C. above the melt temperature, and wherein the thermal impedance is determined under 206.8 kPa (30 psi) pressure when tested using an ASTM D5470 Test capable fixture.

2. The article of claim 1, wherein the phase change material comprises indium.

3. The article of claim 1, wherein the solid phase material further comprises metal foam.

4. The article of claim 3, wherein the metal foam comprises a non-reactive metal having at least one member selected from the group consisting of titanium, tungsten, vanadium, chromium, hafnium, molybdenum, neodymium, and zirconium.

5. The article of claim 3, wherein the metal foam comprises a reactive metal having at least one member selected from the group consisting of copper, silver, gold, nickel, zinc, platinum, and iron.

6. The article of claim 1, further comprising a layer that prevents a chemical reaction with the solid phase material, wherein the solid phase material is adjacent to the layer that prevents the chemical reaction with the solid phase material.

7. The article of claim 6, wherein the chemical reaction is an oxidation-reduction reaction.

8. The article of claim 1, wherein the solid phase material further comprises a porous metallic solid.

9. The article of claim 1, wherein the solid phase material comprises a passivation layer.

10. The article of claim 1, wherein the solid phase material further comprises carbon foam.

11. The article of claim 1, wherein the solid phase material further comprises carbon paper.

12. The article of claim 1, wherein the solid phase material comprises carbon fibers.

13. The article of claim 1, wherein the solid phase material further comprises ceramic particles.

14. The article of claim 13, wherein the ceramic particles comprise iron oxide.

15. The article of claim 1, wherein the self-supporting composite is self-supporting at a temperature of no more than 40° C.

16. The article of claim 1, wherein the phase change material forms a continuous outer surface of the composite.

17. The article of claim 1, wherein the gallium, bismuth, indium, and/or tin is present as an alloy.

18. The article of claim 1, wherein the fibers have an average diameter of no more than 20 micrometers.

19. An article, comprising:
a self-supporting composite having a thickness of between 200 micrometers and 1 mm, the composite comprising a solid phase material comprising fibers and a phase change material, the phase change material comprising a metal, a metal oxide, a metal alloy, or combination thereof, wherein the metal of the metal, metal oxide, metal alloy, or combination comprises gallium, bismuth, indium, and/or tin, and wherein the solid phase material comprises an open pore volume of less than 80 vol %,
wherein the phase change material exhibits a melt temperature of between 10° C. and 65° C., wherein the composite has a thermal impedance of less than 10 mm$^2$ K/W at 10° C. above the melt temperature, and wherein the thermal impedance is determined under 206.8 kPa (30 psi) pressure when tested using an ASTM D5470 Test capable fixture.

20. An article, comprising:
a self-supporting composite having a thickness of between 10 micrometers and 1 mm, the composite comprising a solid phase material comprising fibers and a phase change material that do not chemically react with each other, the phase change material comprising a metal, a metal oxide, a metal alloy, or combination thereof, wherein the metal of the metal, metal oxide, metal alloy, or combination comprises gallium, bismuth, indium, and/or tin, and wherein the composite is free of flux, and the solid phase material comprises an open pore volume of less than 80 vol %,
wherein the phase change material exhibits a melt temperature of between 10° C. and 65° C., wherein the composite has a thermal impedance of less than 10 mm$^2$ K/W at 10° C. above the melt temperature, wherein the composite comprises a thermal impedance within 2 mm$^2$K/W of the thermal impedance after 1000 hours at a temperature of 5° C. above the melt temperature, and wherein the thermal impedance is determined under 206.8 kPa (30 psi) pressure when tested using an ASTM D5470 Test capable fixture.

* * * * *